United States Patent
Wong et al.

(10) Patent No.: US 8,111,136 B2
(45) Date of Patent: *Feb. 7, 2012

(54) USB FINGERPRINT SCANNER WITH TOUCH SENSOR

(75) Inventors: Kwok Fong Wong, Hong Kong (HK); Pui Yi Ching, Hong Kong (HK)

(73) Assignee: Shining Union Limited, Tsuen Wan (HK)

( * ) Notice: Subject to any disclaimer, the term of this patent is extended or adjusted under 35 U.S.C. 154(b) by 33 days.

This patent is subject to a terminal disclaimer.

(21) Appl. No.: 12/635,700

(22) Filed: Dec. 11, 2009

(65) Prior Publication Data

US 2010/0189315 A1    Jul. 29, 2010

Related U.S. Application Data

(63) Continuation-in-part of application No. 12/420,829, filed on Apr. 9, 2009.

(30) Foreign Application Priority Data

Jan. 23, 2009  (HK) ................. 09100803.8

(51) Int. Cl.
*G05B 19/00* (2006.01)

(52) U.S. Cl. ........................ 340/5.83; 340/5.8

(58) Field of Classification Search ............ 340/815.45, 340/815.4
See application file for complete search history.

(56) References Cited

U.S. PATENT DOCUMENTS

| | | | |
|---|---|---|---|
| 5,399,847 A | 3/1995 | Droz | |
| 6,272,562 B1 | 8/2001 | Scott et al. | |
| 7,181,053 B2* | 2/2007 | Wang et al. | 382/124 |
| 7,480,637 B2* | 1/2009 | Kozlay | 705/67 |
| 2003/0005336 A1* | 1/2003 | Poo et al. | 713/202 |
| 2005/0036666 A1* | 2/2005 | Wang et al. | 382/126 |
| 2006/0140458 A1* | 6/2006 | Cheng et al. | 382/124 |
| 2006/0253711 A1* | 11/2006 | Kallmann | 713/186 |
| 2007/0150419 A1* | 6/2007 | Kozlay | 705/67 |
| 2008/0049984 A1* | 2/2008 | Poo et al. | 382/115 |
| 2008/0261450 A1* | 10/2008 | Nguyen et al. | 439/607 |
| 2009/0066478 A1* | 3/2009 | Colella | 340/5.83 |
| 2009/0315709 A1* | 12/2009 | Wong et al. | 340/540 |
| 2010/0090801 A1* | 4/2010 | Wong et al. | 340/5.83 |
| 2010/0188213 A1* | 7/2010 | Wong et al. | 340/540 |

FOREIGN PATENT DOCUMENTS

CN     2357364     1/2000

(Continued)

OTHER PUBLICATIONS

Hong Kong Short-term Patent Application No. HK08111266.6 Search Report.

(Continued)

*Primary Examiner* — Travis Hunnings (57) ABSTRACT

A fingerprint scanner is provided. The fingerprint scanner includes a control module for detecting and controlling the transmission of signals, an electrical connector coupled to the control module for connecting the fingerprint scanner to a periphery device, a plurality of light emitting diode (LED) indicators coupled to the control module to indicate operation status of the fingerprint scanner, and a fingerprint scanning module. The fingerprint scanning module is coupled to the control module to detect fingerprints and sense touches, and send fingerprint signals and touch signals to the control module. The fingerprint scanning module includes a touch sensor for sensing different touches that represent different command signals.

18 Claims, 6 Drawing Sheets

FOREIGN PATENT DOCUMENTS

| | | |
|---|---|---|
| CN | 1302018 | 7/2001 |
| CN | 2472272 | 1/2002 |
| CN | 2520369 | 11/2002 |
| CN | 2549524 | 5/2003 |
| CN | 1560789 | 1/2005 |
| CN | 2674535 | 1/2005 |
| CN | 2816934 | 9/2006 |
| CN | 1912884 | 2/2007 |
| CN | 2911807 | 6/2007 |
| CN | 2927179 | 7/2007 |
| CN | 101171595 | 4/2008 |
| CN | 201114343 | 9/2008 |
| CN | 101320308 | 12/2008 |
| EP | 1107175 | 6/2001 |
| WO | 0152180 | 7/2001 |

OTHER PUBLICATIONS

Hong Kong Short-term Patent Application No. HK08111267.5 Search Report.

Hong Kong Short-term Patent Application No. HK09100803.8 Search Report.

Hong Kong Short-term Patent Application No. HK08113410.7 Search Report.

Hong Kong Short-term Patent Application No. HK08111981.0 Search Report.

Hong Kong Short-term Patent Application No. HK08112026.5 Search Report.

Hong Kong Short-term Patent Application No. HK09102684.8 Search Report.

Hong Kong Short-term Patent Application No. HK08113980.7 Search Report.

Hong Kong Short-term Patent Application No. HK09105479.0 Search Report.

* cited by examiner

USB FINGERPRINT SCANNER WITH TOUCH SENSOR

CROSS-REFERENCE TO RELATED PATENT APPLICATION

The present patent application is a continuation-in-part (CIP) patent application of U.S. patent application Ser. No. 12/420,829 filed Apr. 9, 2009, which claims benefits from Hong Kong short-term Patent Application No. 09100803.8 filed Jan. 23, 2009, the entire contents of which are incorporated herein by reference.

FIELD OF PATENT APPLICATION

The present patent application relates generally to a fingerprint scanning device, and particularly to a universal serial bus (USB) fingerprint scanner with a touch sensor.

BACKGROUND

As science and technology develops, more and more high technology products are used in consumer's daily life. A fingerprint scanning device is one of the high technology products that are widely used in areas such as electronic door entrances, ID verification in computing systems and banking systems, etc. However, existing fingerprint scanning devices do not provide users with any indications as to whether the fingerprint scanning is successful or not, or what is the operation status of the fingerprint scanning devices. Therefore, there is a need to produce an improved fingerprint scanning device that is able to indicate the operation status of the fingerprint scanning device and indicate whether the fingerprint scanning is successful or not during the fingerprint scanning process.

The above description of the background is provided to aid in understanding a USB fingerprint scanner, but is not admitted to describe or constitute pertinent prior art to the USB fingerprint scanner disclosed in the present patent application, or consider any information as material to the patentability of the claims of the present patent application.

SUMMARY

A fingerprint scanner is provided. The fingerprint scanner includes a control module for detecting and controlling the transmission of signals, an electrical connector coupled to the control module for connecting the fingerprint scanner to a periphery device, a plurality of light emitting diode (LED) indicators coupled to the control module to indicate operation status of the fingerprint scanner, and a fingerprint scanning module. The fingerprint scanning module is coupled to the control module to detect fingerprints and sense touches, and send fingerprint signals and touch signals to the control module. The fingerprint scanning module includes a touch sensor for sensing different touches that represent different command signals; the different touches comprises at least a first touch and a second touch, touch time of the first touch lasts shorter than a predetermined period of time and touch time of the second touch lasts longer than the predetermined period of time, the control module runs a first mode if the first touch is detected and runs a second mode if the second touch is detected.

The fingerprint scanning module may include a fingerprint sensor in the form of a flexible circuit.

The fingerprint scanning module may include a radio frequency fingerprint scanning module.

The plurality of LED indicators may have different sizes arranged in a series according to their sizes.

The plurality of LED indicators may be disposed separately from the flexible circuit.

The plurality of LED indicators may have different colors to indicate different scanning status of the fingerprint scanner.

The fingerprint scanner may further include an audio indicator to indicate the scanning status of the fingerprint scanner. The audio indicator may be a speaker or a buzzer.

The electrical connector may be a USB connector.

The fingerprint scanning module may adopt vertical or horizontal fingerprint scanning.

The fingerprint scanning module may adopt annular fingerprint scanning. The annular fingerprint scanning is in a clockwise or anticlockwise direction with finger movement through more than 20 degrees.

The fingerprint scanning module may adopt a combination of linear and annular fingerprint scanning.

The control module may receive fingerprint scanning signals from the fingerprint scanning module and send commands that correspond to the fingerprint scanning signals to a host computer.

BRIEF DESCRIPTION OF THE DRAWINGS

Specific embodiments of the USB fingerprint scanner disclosed in the present patent application will now be described by way of example with reference to the accompanying drawings wherein.

DETAILED DESCRIPTION

Reference will now be made in detail to a preferred embodiment of the USB fingerprint scanner disclosed in the present patent application, examples of which are also provided in the following description. Exemplary embodiments of the USB fingerprint scanner disclosed in the present patent application are described in detail, although it will be apparent to those skilled in the relevant art that some features that are not particularly important to an understanding of the USB fingerprint scanner may not be shown for the sake of clarity.

Furthermore, it should be understood that the USB fingerprint scanner disclosed in the present patent application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element, or is in mechanical or electrical communication with another element.

Figure 1:
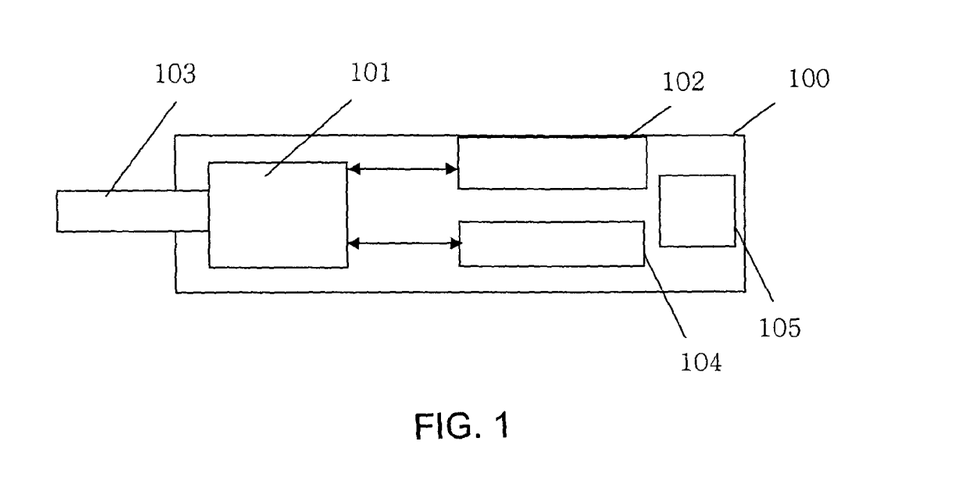
FIG. 1 is a block diagram of the USB fingerprint scanner according to an embodiment disclosed in the present patent application.

FIG. 1 shows a block diagram of the USB fingerprint scanner according to an embodiment disclosed in the present patent application. The USB fingerprint scanner may include a housing 100, a control module 101 mounted within the housing 100, a fingerprint scanning module 102 coupled to the control module 101, a USB plug or connector 103 coupled to the control module 101, one or more LED indicators 104 coupled to the control module 101 to indicate the scanning status of the fingerprint scanner, and an audio indicator 105 to indicate the scanning status of the fingerprint scanner.

Figure 2:
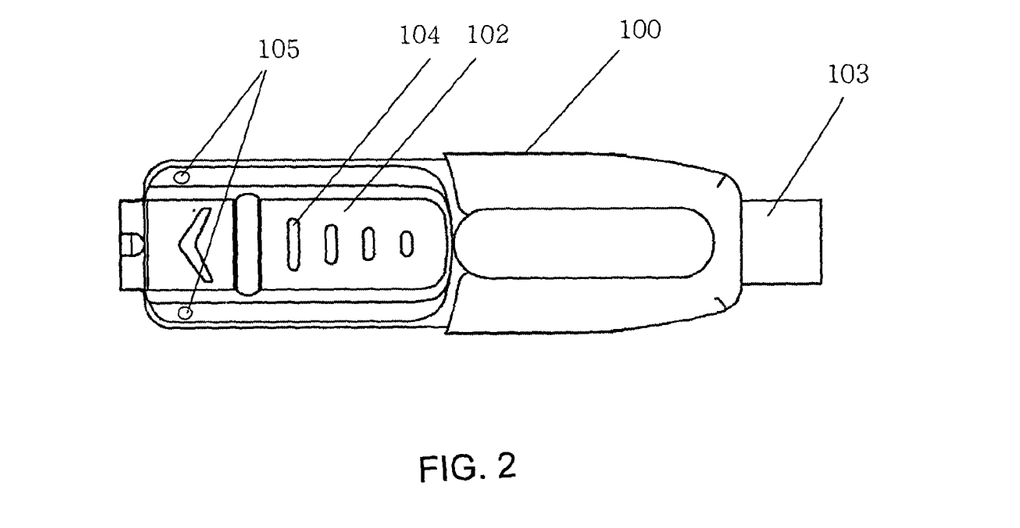
FIG. 2 is a top plan view of the USB fingerprint scanner according to an embodiment disclosed in the present patent application.

The housing 100, as shown in FIG. 2, may be shaped and sized to accommodate therein the control module 101, the fingerprint scanning module 102 and the USB connector 103. The housing 100 may be made of plastic or any suitable material.

Figure 3:
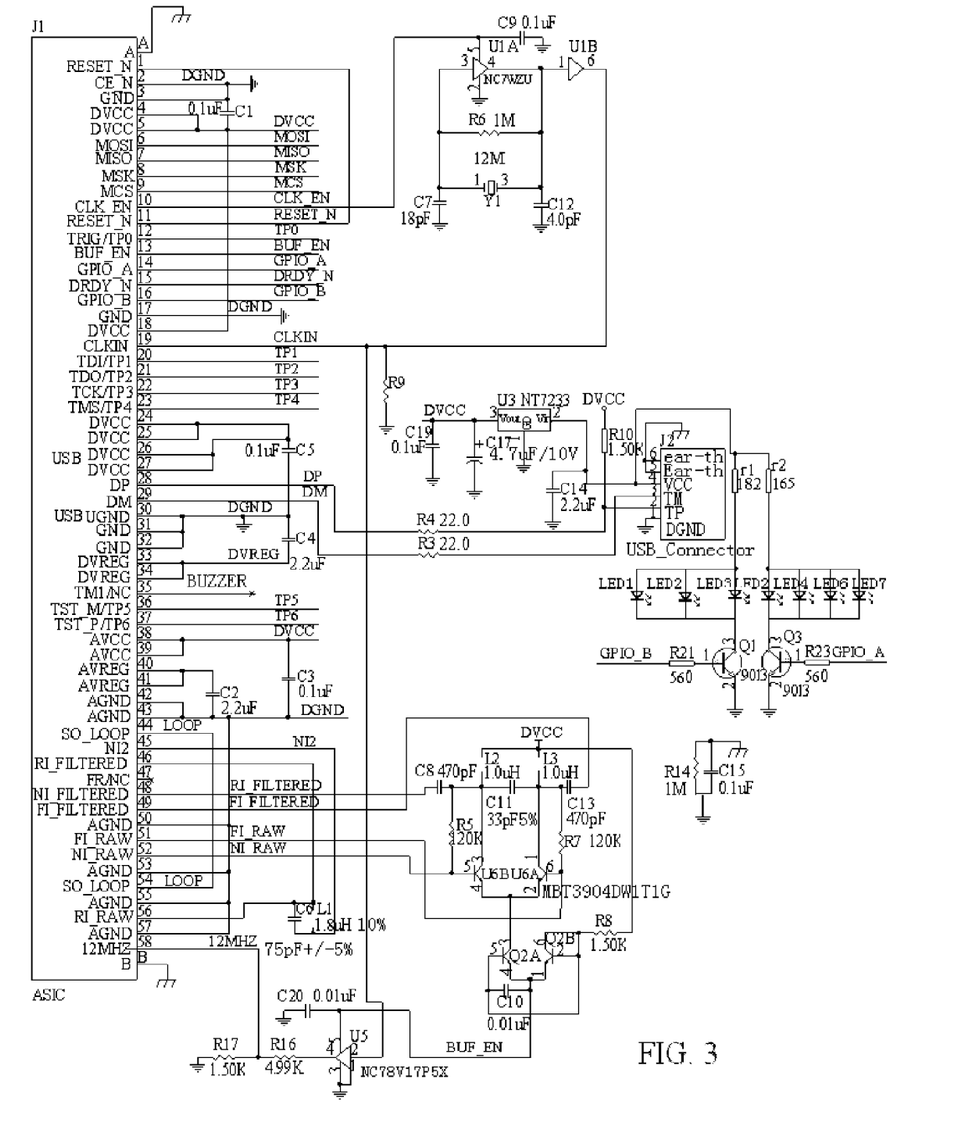
FIG. 3 is a circuit diagram of the USB fingerprint scanner.

The control module 101 may be in the form of a board with electrical circuits formed thereon. The control module 101 can be fixedly mounted inside the housing 100. The control module 101 includes circuits for detecting signals and controlling the transmission of the detected signals. For example, the control module 101 can receive and process the fingerprint signals transmitting from the fingerprint scanning module 102 and send the processed fingerprint signals through the USB connector 103 to a periphery device such as a host computer or an electronic door entrance. The control module 101 may also receive signals from the fingerprint scanning module 101 and transmit signals to the LED indicators 104 to indicate the operation status of the fingerprint scanner 102 during a fingerprint scanning process. A circuit diagram of the USB fingerprint scanner of the present patent application is shown in FIG. 3.

Figure 4:
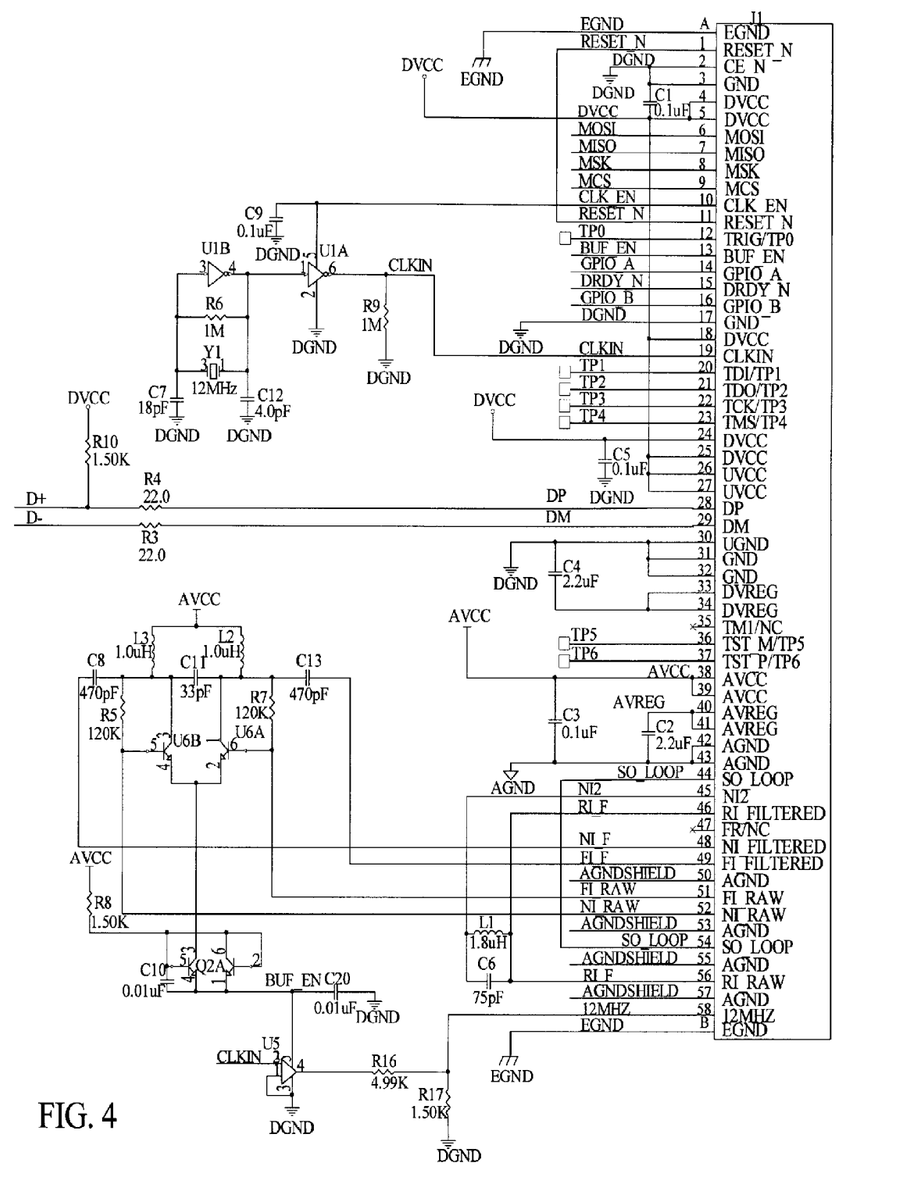
FIG. 4 is a circuit diagram of a fingerprint sensor of the USB fingerprint scanner.

The fingerprint scanning module 102 may include a fingerprint sensor for detecting fingerprints and transmitting fingerprint signals to the control module 101. The fingerprint scanning module 102 may be in the form of any existing fingerprint scanning module. For example, the fingerprint scanning module 102 can be in the form of a radio frequency fingerprint scanning module. The fingerprint scanning module 102 may use a flexible circuit as a sensor for detecting the fingerprints. A circuit diagram of a fingerprint sensor of the fingerprint scanning module 102 is shown in FIG. 4. The size of the fingerprint scanning module 102 should be small enough to be accommodated within the housing 10 rendering the USB fingerprint scanner of the present patent application small, lightweight, compact and portable.

The fingerprint scanning module 102 may have a touch sensor for sensing a touch by a user and sending a touch signal to the control module 101. For example, when a user touches a surface of the sensor by a finger, the sensor of the fingerprint scanning module 102 can sense the touch and send a corresponding signal/command to a host computer. Different touches can be defined to represent different command signals. For example, a continuous and quick touch on the surface of the sensor may be defined as a signal to turn on the host computer, and two continuous and quick touches on the surface of the sensor may be defined as a signal to turn on the display of the host computer, and so on.

The fingerprint scanning module 102 may adopt horizontal or vertical fingerprint scanning. For example, when a user places his or her finger on the surface of the sensor of the fingerprint scanning module 102, the fingerprint scanning module 102 may carry out fingerprint scanning horizontally from left to right, or vertically from top to bottom, or a combination thereof at the same time. The fingerprint scanning module 102 may adopt annular scanning in a clockwise or anticlockwise direction. This can be achieved by moving a finger on the surface of the sensor clockwise or anticlockwise through a certain degree, such as more than 20 degrees. The fingerprint scanning module 102 may also adopt a combination of linear and annular fingerprint scanning.

The fingerprint scanner in the present patent application can also detect finger swiping direction by the following steps:

1. Capture a fingerprint image by using a line sensor that can sense from the moment a finger touches the sensor to the moment the finger leaves the sensor. The captured image will therefore contain a fingerprint with information on time (i.e. finger motion).
2. Determine the gradient (slope) of the line pattern of the image by (i) applying an edge detection algorithm on the gray scale image, and (ii) determining the gradient of each line (edge).
3. Determine the finger swiping direction based on the line pattern.

The fingerprint scanner of the present patent application may contain very small RF transmitters and a RF receiver. When a user touches the sensor, it will affect the impedance in the sensor. After detecting the change of impedance, the sensor can recognize that a user is touching the sensor of the fingerprint scanner.

Figure 5:
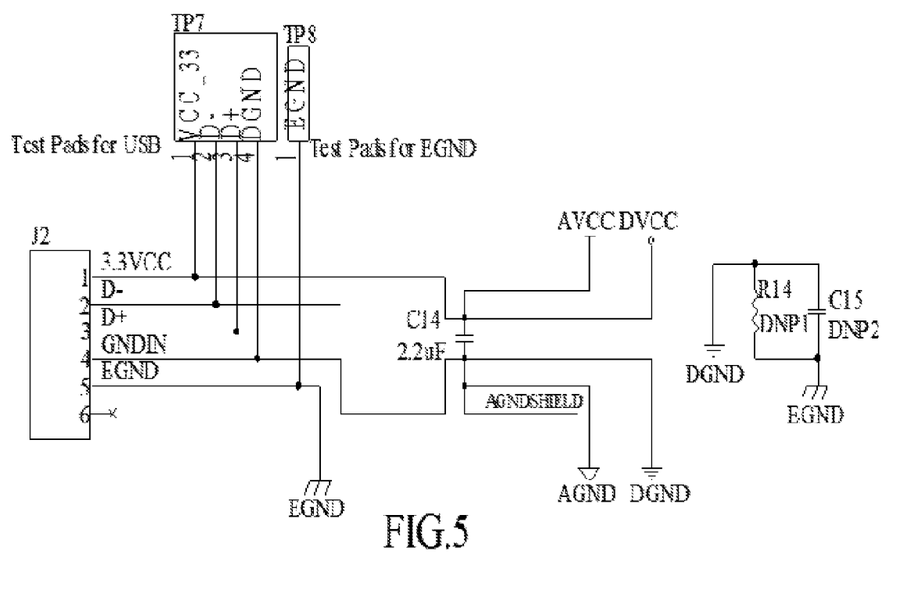
FIG. 5 is a circuit diagram of a USB interface of the USB fingerprint scanner.

The USB connector 103 is coupled to the control module 101 and provides an interface between the fingerprint scanner and the periphery devices such as a host computer. A circuit diagram of the USB interface of the fingerprint scanner of the present patent application is shown in FIG. 5. It is understood by one skilled in the art that any other forms of connector, such as an IEEE1394 connector, or any wireless communication such as infrared or Bluetooth may be employed.

The LED indicators 104 are employed to indicate the operation status of the USB fingerprint scanner. According to the illustrated embodiment in FIG. 2, a plurality of LED indicators 104 is provided on an upper surface of the housing 100 of the USB fingerprint scanner. The plurality of LED indicators 104 can be of different shapes, sizes or colors to indicate to the user different operating conditions of the USB fingerprint scanner during a fingerprint scanning process.

As shown in the illustrated embodiment in FIG. 2, there are four oblong-shaped LED indicators 104 with elongated sides extending transversely across the housing 100. It can be seen that the four LED indicators 104 can have similar shapes but different sizes and are arranged in a series on the housing 100 according to their sizes. The four LED indicators 104 can be used to indicate the operation status of the fingerprint scanner. For example, one of the LED indicators 104 may be lit when fingerprint scanning is not successful and two of the LED indicators 104 may be lit when fingerprint scanning is successful. One or more of the LED indicators 104 may be flashing to indicate that the fingerprint scanning is in progress. The lights of all of the LED indicators 104 may be switched off to indicate the completion of the fingerprint scanning process.

The LED indicators 104 may be in different colors to indicate different operating conditions of the fingerprint scanner. For example, the LED indicators 104 may be lit in green color when the fingerprint scanning is successful and in red color when the fingerprint scanning is not successful.

In addition to the four LED indicators 104, there is one LED indicator in the shape of an arrow head or a triangular bracket pointing at one end of the housing 100. This LED indicator can be used to indicate the operating instructions or operating position on the fingerprint scanner. For example, the LED indicator can be lit in green color to indicate that the fingerprint scanner is in its "on" position ready for fingerprint scanning, or the LED indicator 104 can be used to point at a position at the end of the housing 100 where a user can access a fingerprint scanning surface of the fingerprint scanner. The user can then place his/her finger on the fingerprint scanning surface to start the fingerprint scanning process.

Figure 6:
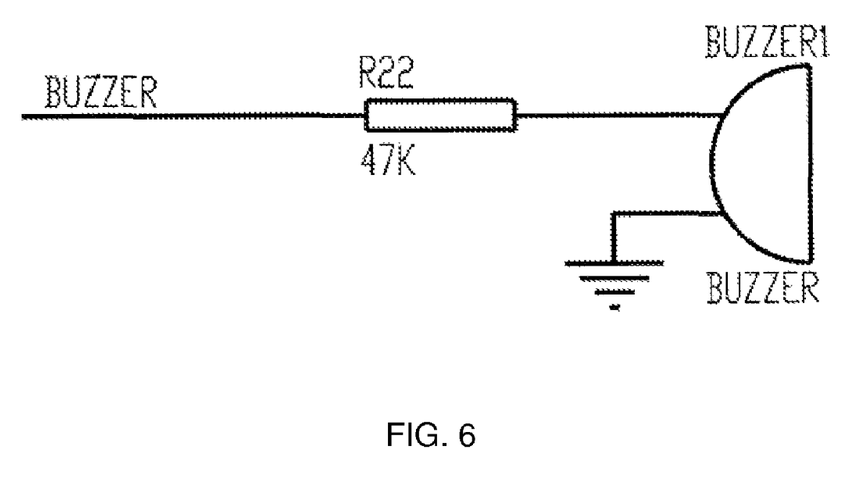
FIG. 6 is a circuit diagram of an audio indicator of the USB fingerprint scanner.

The fingerprint scanner may also include an audio indicator 105. The audio indicator 105 may be connected to the control module 101 to indicate the scanning status of the fingerprint scanning device. The audio indicator 105 may be in the form of a speaker or a buzzer so long as it can generate an audible sound. For example, a short audible sound may represent successful scanning and a long audible sound may represent a scanning failure. FIG. 6 is a circuit diagram of the audio indicator 105 of the USB fingerprint scanner.

Figure 7:
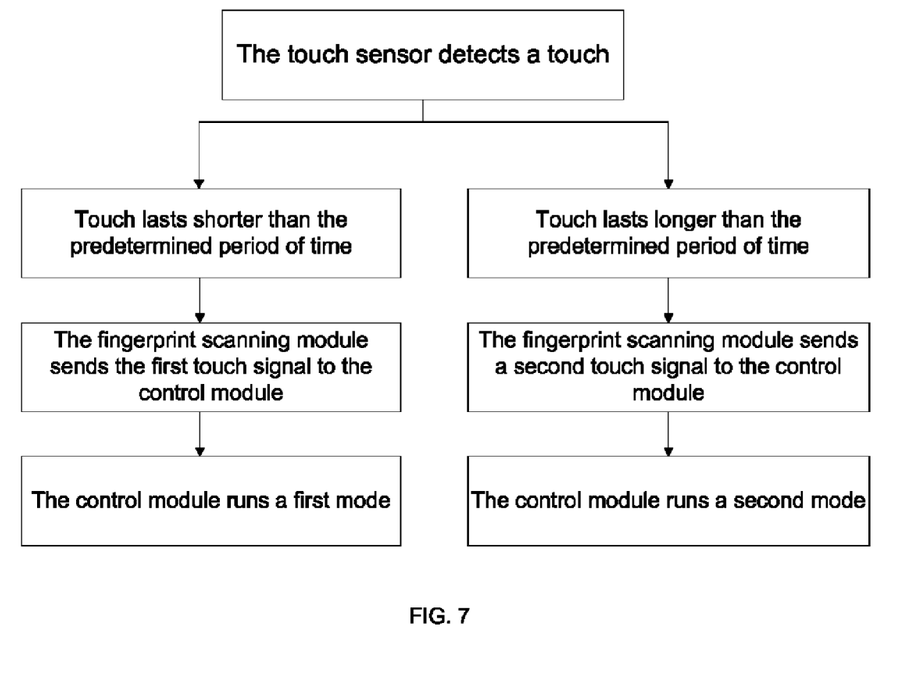
FIG. 7 shows a work flow chart of the USB fingerprint scanner.

In one embodiment, the touch sensor can detect at least two different kinds of touch commands. Two different kinds of touch commands include a first touch and a second touch. The touch time of the first touch lasts shorter than a predetermined period of time, and the touch time of the second touch lasts longer than a predetermined period of time. As shown in FIG. 7, if the touch sensor detects the first touch, the fingerprint scanning module 102 sends a first touch signal to the control module 101, and the control module 101 runs a first mode. If the touch sensor detects the second touch, the fingerprint scanning module 102 sends a second touch signal to the control module 101, and the control module 101 runs a second mode. The predetermined period of time can be varied. For example, the predetermined period of time may be 1, 1.5 or 2 seconds.

In another embodiment, the fingerprint scanner can be connected to a computer. If touch time on the touch sensor is shorter than a predetermined period of time (for example, 1.5 second), the fingerprint scanning module sends the first touch signal to the control module 101. The first mode of the control module 101 is run; and the control module 101 sends a first control signal to the computer through an electrical connector (for example, a USB connector). The computer then locks its screen immediately. If the fingerprint scanning module detects a fingerprint which is the same as the first touch's fingerprint, the computer unlocks its screen.

If touch time on the touch sensor is longer than a predetermined period of time (for example, 1.5 second), the fingerprint scanning module sends the second touch signal to the control module 101. The second mode of the control module 101 is run, and the control module 101 sends a second control signal to the computer through the electrical connector. The computer then changes its screen image from a first screen image into a second screen image. If the fingerprint scanning module detects a fingerprint which is the same as the second touch's fingerprint, the computer changes its screen image back to the first screen image.

While the USB fingerprint scanner disclosed in the present patent application has been shown and described with particular references to a number of preferred embodiments thereof, it should be noted that various other changes or modifications may be made without departing from the scope of the appending claims.

What is claimed is:

1. A fingerprint scanner comprising:
a control module for detecting and controlling the transmission of signals;
an electrical connector coupled to the control module for connecting the fingerprint scanner to a periphery device;
one or more light emitting diodes (LEDs) indicators coupled to the control module to indicate operation status of the fingerprint scanner; and
a fingerprint scanning module coupled to the control module to detect fingerprints and sense touches, and send fingerprint signals and touch signals to the control module, the fingerprint scanning module comprising a touch sensor for sensing different touches that represent different command signals; wherein the different touches comprises at least a first touch and a second touch, touch time of the first touch lasts shorter than a predetermined period of time and touch time of the second touch lasts longer than the predetermined period of time, the control module runs a first mode if the first touch is detected and runs a second mode if the second touch is detected.

2. The fingerprint scanner as claimed in claim 1, wherein the fingerprint scanning module comprises a fingerprint sensor in the form of a flexible circuit.

3. The fingerprint scanner as claimed in claim 1, wherein the fingerprint scanning module comprises a radio frequency fingerprint scanning module.

4. The fingerprint scanner as claimed in claim 1, wherein the LEDs indicators comprises different sizes arranged in a series according to their sizes.

5. The fingerprint scanner as claimed in claim 2, wherein the LEDs indicators is disposed separately from the flexible circuit.

6. The fingerprint scanner as claimed in claim 1, wherein the LEDs indicators comprises different colors to indicate different scanning status of the fingerprint scanner.

7. The fingerprint scanner as claimed in claim 1, further comprising an audio indicator to indicate the scanning status of the fingerprint scanner.

8. The fingerprint scanner as claimed in claim 7, wherein the audio indicator comprises a speaker or a buzzer.

9. The fingerprint scanner as claimed in claim 1, wherein the electrical connector comprises a USB connector.

10. The fingerprint scanner as claimed in claim 1, wherein the fingerprint scanning module adopts vertical or horizontal fingerprint scanning.

11. The fingerprint scanner as claimed in claim 1, wherein the fingerprint scanning module adopts annular fingerprint scanning.

12. The fingerprint scanner as claimed in claim 11, wherein the annular fingerprint scanning is in a clockwise or anti-clockwise direction with finger movement through more than 20 degrees.

13. The fingerprint scanner as claimed in claim 1, wherein the fingerprint scanning module adopts a combination of linear and annular fingerprint scanning.

14. The fingerprint scanner as claimed in claim 1, wherein the control module receives fingerprint scanning signals from the fingerprint scanning module and sends commands that correspond to the fingerprint scanning signals to a host computer.

15. The fingerprint scanner as claimed in claim 1, wherein:
a continuous touch on the touch sensor is defined as a first signal; and
two continuous touches on the touch sensor is defined as a second signal which different from the first signal.

16. The fingerprint scanner as claimed in claim 1, wherein the predetermined period of time is 1.5 second.

17. The fingerprint scanner as claimed in claim 1, wherein the periphery device comprises a computer, the computer locks its screen if the first mode of the control module is run; and the computer unlocks its screen if the fingerprint scanning module detects a fingerprint which is the same as the first touch's fingerprint.

18. The fingerprint scanner as claimed in claim 1, wherein the periphery device comprises a computer, the computer changes its screen image from a first screen image into a second screen image if the second mode of the control module is run; and the computer changes its screen image back to the first screen image if the fingerprint scanning module detects a fingerprint which is the same as the second touch's fingerprint.

* * * * *